(12) United States Patent
Michel et al.

(10) Patent No.: US 7,797,675 B1
(45) Date of Patent: Sep. 14, 2010

(54) CATEGORICAL APPROACH FOR IMPLEMENTING A SOFTWARE COMPONENT DEVELOPMENT ARCHITECTURE

(75) Inventors: Ruben Michel, Hopkinton, MA (US); Stanislav Sosnovsky, Upton, MA (US); Ilya Liubovich, Shrewsbury, MA (US); Richard Francis Cormier, Franklin, MA (US)

(73) Assignee: EMC Corporation, Hopkinton, MA (US)

(*) Notice: Subject to any disclaimer, the term of this patent is extended or adjusted under 35 U.S.C. 154(b) by 1484 days.

(21) Appl. No.: 11/137,749

(22) Filed: May 25, 2005

(51) Int. Cl.
*G06F 9/44* (2006.01)

(52) U.S. Cl. .................. 717/107; 717/102; 717/121; 717/123

(58) Field of Classification Search ............ None
See application file for complete search history.

(56) References Cited

U.S. PATENT DOCUMENTS 6,633,923 B1 * 10/2003 Kukura et al. ............... 719/316
2003/0195997 A1 * 10/2003 Ibert et al. ................... 709/318

* cited by examiner

*Primary Examiner* — Chuck O Kendall
(74) *Attorney, Agent, or Firm* — Chapin IP Law, LLC (57) ABSTRACT

A system produces a component framework that insulates components from an underlying communication infrastructure by receiving a component descriptor that specifies fundamental properties of a component and receiving a definition of remotable interfaces associated with the component. A generation tool emits a component framework that includes: i) a coInterface interface that exposes the component's remotable interfaces; ii) a coFactories interface that declares factories for component operation; iii) a template for a coClass class, the coClass class operable to receive developer programmed functionality; and iv) a coBridge class that extends the coClass class and functions as a morphism from an IDL-defined component to an object model based, middleware-independent component.

21 Claims, 9 Drawing Sheets

CATEGORICAL APPROACH FOR IMPLEMENTING A SOFTWARE COMPONENT DEVELOPMENT ARCHITECTURE

BACKGROUND

Modern computer software applications are often distributed among computer systems and require ability to access and exchange information with other remotely operating software applications. Such exchanges of data and access to functionality often take place over a computer network such as a local area network or a wide area network such as the Internet. Due to the complexities and varying mechanisms of implementing functionality and data formats within modern software applications, software developers often employ software commonly referred to as "middleware" that provides a standardized mechanism for the exchange of information and access to functionality among two or more remotely operating software programs. Middleware is generally connectivity software that consists of a set of enabling services that allow multiple processes running on one or more machines to interact across a network.

Middleware allows a software developer to create a software application using calls to a middleware-specific application programming interface or API in order to insulate the software developer from having to know the details of how to access the remotely operating software application and associated remote data structures or objects. By incorporating a set of middleware-specific function calls into the application under development, the software developer relies on the middleware transport and data access mechanisms and does not need to be concerned with details such as creation of connections to remote computer systems. Middleware is thus software that connects otherwise separate applications or separate products and serves as the glue between the applications. Middleware is thus distinct from import and export features that may be built into one of the applications. Developers often refer to middleware "plumbing" because it connects two sides of an application and passes data between them. For example, there are a number of middleware products that link a database system to a web server. This allows a user application to request data from the database using forms displayed on a web browser, and it enables the web server to return dynamic web pages based on the user application's requests.

One example of commonly used middleware architecture is called CORBA. CORBA is an acronym for Common Object Request Broker Architecture. The CORBA environment is an industry standard that is maintained by Object Management Group, Inc. (OMG) of Needham, Mass., USA. As described on OMG's web site, CORBA provides a vendor-independent architecture and infrastructure that computer applications use to work together over data networks. Using standardized protocols, a CORBA-based program from any vendor, on almost any computer, operating system, programming language, and network, can interoperate with a CORBA-based program from the same or another vendor, on almost any other computer, operating system, programming language, and network.

Conventional CORBA applications are composed of objects that are individual units of running software that combine functionality and data. Typically, there are many instances of an object of a single type. For example, an e-commerce website would have many shopping cart object instances, all identical in functionality but differing in that each is assigned to a different customer (i.e., client browser), and each contains data representing the merchandise that its particular customer has selected. For other object types, there may be only one instance. As an example, when a legacy application, such as an accounting system, is wrapped in code with CORBA interfaces and opened up to clients on a network, there is usually only one instance.

For each object type, such as the shopping cart mentioned above, a developer using middleware such as CORBA defines an interface in the OMG Interface Description Language (IDL). The interface is a syntax part of a contract that a server object offers to client programs that invoke functionality and access data within that server object. Any client that wants to invoke an operation on the object must use this IDL interface specification (i.e., object specification) to specify the operation it wants to perform, and to marshal arguments (i.e., parameters or data) that the client sends and receives from the server for access to that object. When the invocation reaches the target object, the same interface definition is used there to unmarshal the arguments so that the object can perform the requested data processing operation with the arguments. The interface definition is then used to marshal the results for their trip back to the client, and to unmarshal them when they reach the client destination.

A conventional IDL interface definition is independent of a selected programming language, but maps to all of the popular programming languages via industry standards. As an example, there are standardized mappings from IDL to C, C++, Java, COBOL and other languages.

The use of a middleware-specific interface, such as a CORBA call, that is separate from the middleware implementation, enabled by the IDL, is one essence of middleware such as CORBA and explains how conventional middleware enables interoperability between applications with all of the above noted transparencies. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

Figure 1:
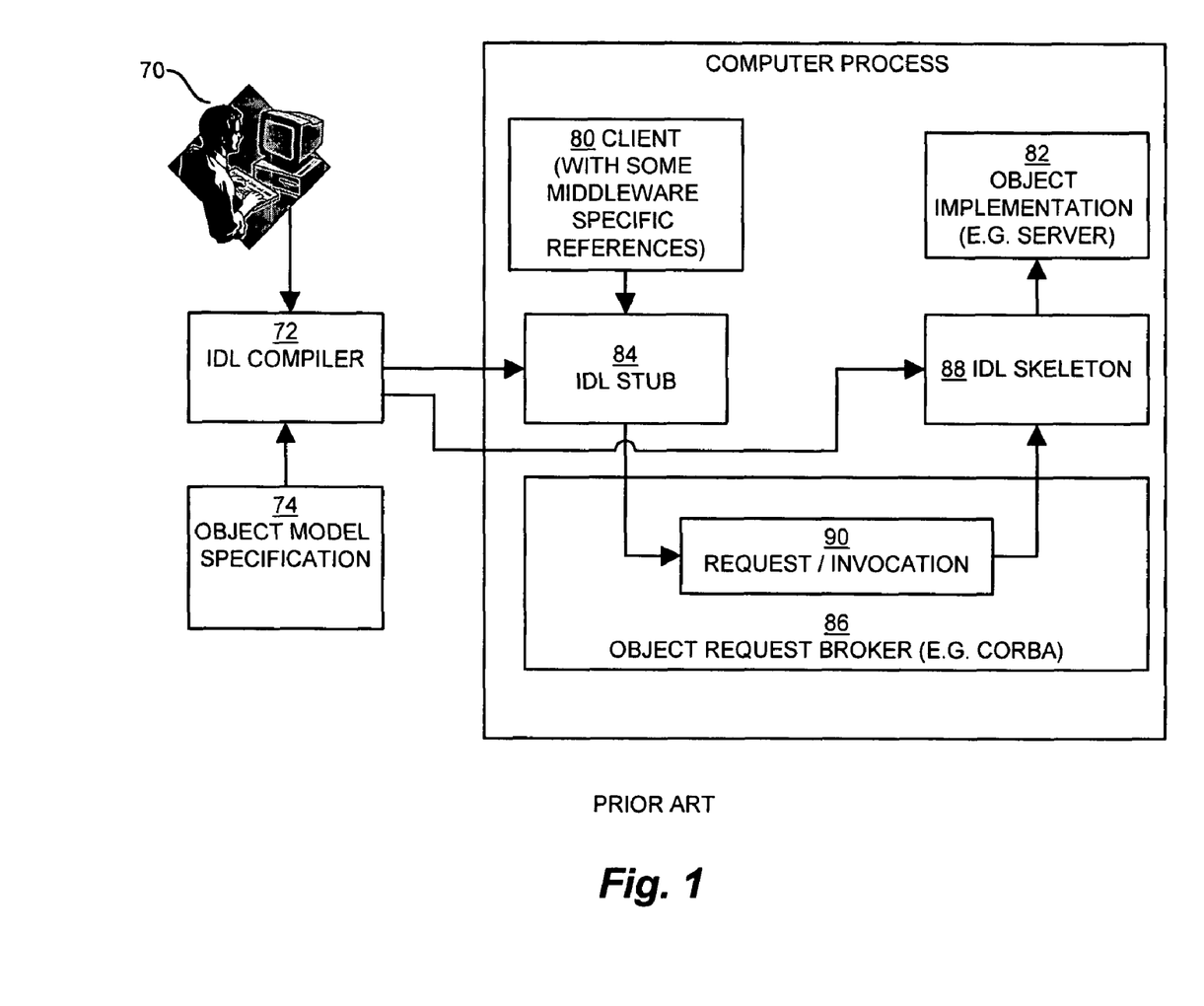
FIGS. 1 and 2 are prior art illustrations of operations of conventional middleware.

FIG. 1 is a prior art illustration of an invocation 90 by a single client process 80 for access to an object implementation 82 using middleware such as CORBA including an IDL stub 84, an object request broker 86, and an IDL skeleton 88. While the instant example uses CORBA as the middleware platform, the example applies to other conventional middleware platforms as well.

Prior to execution, a developer 70 using an IDL compiler 72 compiles an object model specification 74 defined in IDL into client IDL stubs 84 and object skeletons 88, and writes the code for the client 80 and for the object implementation 82. The stubs 84 and skeletons 88 serve as proxies for clients 80 and object 82 (e.g., server), respectively. Because IDL defines interfaces so strictly, the stub 84 on the client side has no trouble meshing perfectly with the skeleton 88 on the server side, even if the two are compiled into different programming languages. If CORBA is the middleware that provides the object request broker (ORB) 86, the CORBA ORB 86 can even be produced from different vendors so long as it conforms to the CORBA standard.

In CORBA, every object instance 82 has its own object reference in the form of an identifying electronic token or string. Clients 80 use the object references to direct their invocations 90, identifying to the ORB 86 the exact instance of an object 82 that the client 80 wants to invoke. Using the shopping cart example, this ensures that the shopping cart object 82 for one client 80 is different from a shopping cart object of another client. The client 80 acts as if it is invoking an operation on the object instance 82, but the client 80 is actually invoking a call on the IDL stub 84 that acts as a proxy to the object 82. Passing through the stub 84 on the client side, the invocation 90 continues through the ORB 86, and the skeleton 88 on the server side, to get to the object implementation 82 where it is executed. FIG. 1 thus shows an invocation when the client is collocated with the server.

Figure 2:
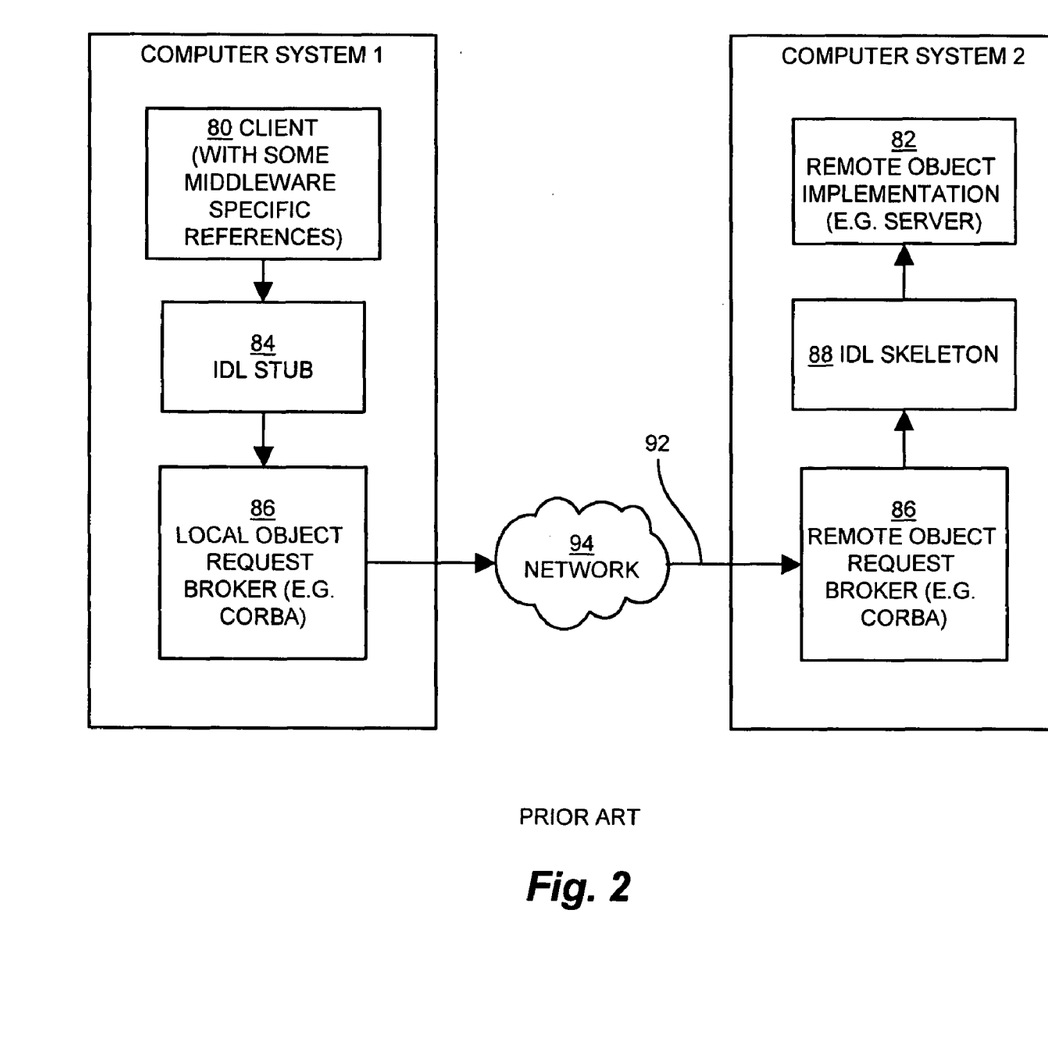

FIG. 2 diagrams a remote invocation 92 that occurs over a network. In order to invoke the remote object instance 94, the client 80 first obtains its object reference using, e.g., a naming or trading service or a stringified IOR. To make the remote invocation 92, the client 80 uses the same code used in the local invocation described in FIG. 1, but substitutes the object reference for the remote object instance 94. When the local ORB 86 examines the object reference and discovers that the target object 94 is a remote object, the local ORB 86 routes the invocation 92 out over a network 94 to the remote object's ORB 96.

To identify the correct object 94, the client 80 knows the type of object 94 that it is invoking (e.g., that it's a shopping cart object), and the client stub 84 and object skeleton 88 are generated from the same IDL object model specification 74. This means that the client 80 knows exactly which operations it may invoke, what the input parameters are, and where they have to go in the invocation. Accordingly, when the invocation 92 reaches the target object 94, all parameters are present. Additionally, the local client's 80 ORB 86 and the remote object's ORB 96 operate on a common protocol that provides a representation to specify the identity of the target object 94, its operation, and all parameters (input and output) of every type that they may use. Accordingly, although the local ORB 86 can tell from the object reference that the target object 94 is a remote object, the client 80 does not know the physical operating location of the target object 94. There is nothing in the object reference token obtained by the client 80 that the client holds and uses at invocation time that identifies the location of the target object 94. The token is opaque to the client. This ensures location transparency in order to simplify the design of distributed object computing applications.

SUMMARY

Modern large-scale software design is often based on componentization. Examples include CORBA CCM, J2EE, Microsoft COM, Microsoft .NET, and Tomcat. Components do not live in isolation but instead, they are hosted in a component server that provides the operating infrastructure, which includes authentication, authorization, component discovery, event notification, logging, networking, persistence, transaction management, etc.

While only a handful of programmers develop the component server and the component infrastructure, many programmers will develop multiple components of different flavors and sizes, which will execute within the component server. To facilitate and protect the component-development effort, the component framework hermetically insulates the components from the underlying communication infrastructure (CORBA in the current effort). Despite the component's isolation from the actual communication infrastructure, the component framework provides full access to the component's remotable interfaces, which the component must realize using plain Java code. Furthermore, since components do not execute in isolation, the component framework also provides each component with invocation access on all the remotable interfaces exposed by its dependent components; this invocation access is also independent of the communication infrastructure. The component development infrastructure, or framework, is now explained in more detail.

In a software development environment, developers generate many software elements, or components, for performing various services via a deliverable application. A storage area network, for example, may employ a SAN management application. The SAN management application includes many components for providing monitoring and management services of the SAN. Development and modification of the SAN management application entails many developers working on multiple components. Accordingly, it is beneficial to provide a component framework to compartmentalize the components to insulate developers from irrelevant or extraneous details. Middleware is one mechanism for implementing a generic communication infrastructure between the various components that suppresses the underlying interprocess communication and allows developers to focus on the application service logic operable to deliver the operation which is the subject of the particular component (i.e. the application functionality attributed to the component).

In further detail, configurations herein provide method of producing a component framework that insulates components from an underlying communication infrastructure, the method including receiving a component descriptor that specifies fundamental properties of a component, and receiving a definition of remotable interfaces associated with the component. A user or developer operates a generation tool to emit a component framework that includes:

i) a coInterface interface that exposes the component's remotable interfaces;

ii) a coFactories interface that declares factories for component operation;

iii) a template for a coClass class, the coClass class operable to receive developer programmed functionality; and iv) a coBridge class that extends the coClass class and functions as a morphism from an IDL-defined component to an object model based, middleware-independent component.

In particular configurations, receiving the component descriptor further comprises specifying interface definition files that define the component's remotable interfaces, specifying components on which the component depends, and specifying additional files and libraries used by the component.

In the exemplary arrangement, operating the generation tool further comprises emitting a plurality of types corresponding to the component framework, further including receiving, by the generation tool a component descriptor, component remotable interfaces specified according to the interface definition, and information about the dependent components. Code generation further includes operating a categorical-based generation tool to emit the component framework.

In particular arrangements, generating the coInterface interface further includes, for each method in each remotable interface, emitting a method in the coInterface having similar parameter types and return type, and having an encoded name. The framework provides for a naming convention for methods in the coInterface to prevent name collisions, wherein multiple interfaces are funneled into a single component interface.

In the exemplary configuration, generating the coFactories interface further comprises generating factories for IDL structs and exceptions. Generating the coFactories interface further includes generating factories for dependent components as specified in the corresponding component descriptor. Generating the coFactories interface further comprises generating factories for friend components, and further includes generating interface downcast operators.

The exemplary configuration further includes generating a coFrameworkOperations interface, in which the coFrameworkOperations interface is operable to expose basic framework functionality, and a coBaseInterface interface, which extends the coInterface, the coFactories, and the coFrameworkOperations interface, the coBaseInterface for providing a level of indirection in the inheritance hierarchy for allowing the exposure of future functionality, and for avoiding perturbing handwritten derived classes. A coClass derives from the coBaseInterface, the coClass operable to receive business logic implemented by component developers for performing component's functionality.

In particular arrangements, the coBridge is further operable to delegate remote middleware calls to the coClass, and translate between the types in the interface definition and the interface object model. The coBridge is further operable to implement the coFactories interface, to initialize static members in enums of the interface definition object model, and is operable to provide generative, aspect-oriented programming, further comprising natural interception points.

In particular configurations, for each middleware interface, a second generation tool emits a class, whose instance serves as a servant for that interface, the class delegating calls to the coBridge following a naming convention. The second generation tool also injects framework functionality into the component by emitting the coFramework class, the coFramework class extending the coBridge and further operable for recording the component's label and version, managing thread termination for active-object components, holding references to middleware objects such as the ORB, the component's POA, and the component's servants and their names. The second generation tool is further operable to emit the coFramework class to manage the component's logger, record a session id for session components, and implement the coFrameworkOperations interface.

Alternate configurations of the invention include a multi-threaded or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5-9 are a flowchart of software development using the framework of FIG. 4.

DETAILED DESCRIPTION

The software component architecture, or framework defined further below employs a generic communication and invocation infrastructure to compartmentalize the components and insulate developers from irrelevant or extraneous details. A middleware based architecture and mechanism implements a generic communication infrastructure, such as a CORBA based object request broker, between the various components that hides (i.e. performs information hiding) the underlying interprocess communication and allows developers to focus on the service (application) logic of the component. Promoting such detail suppression and module (e.g. component) compartmentalization tend to be problematic in development of a conventional large software application. Using conventional software development environments, insulating the individual components, and thus the developers working on those components, may be difficult to achieve when many components interact with many other components. Accordingly, the framework disclosed herein provides a development architecture for developing components (e.g. software components) in a middleware independent manner which layers the intercomponent communication in an architecture that relieves the application logic from details of the intercomponent communication mechanism, and avoids injecting details about the underlying communication infrastructure into the application code logic for providing the desired service or operation of the component.

Figure 3:
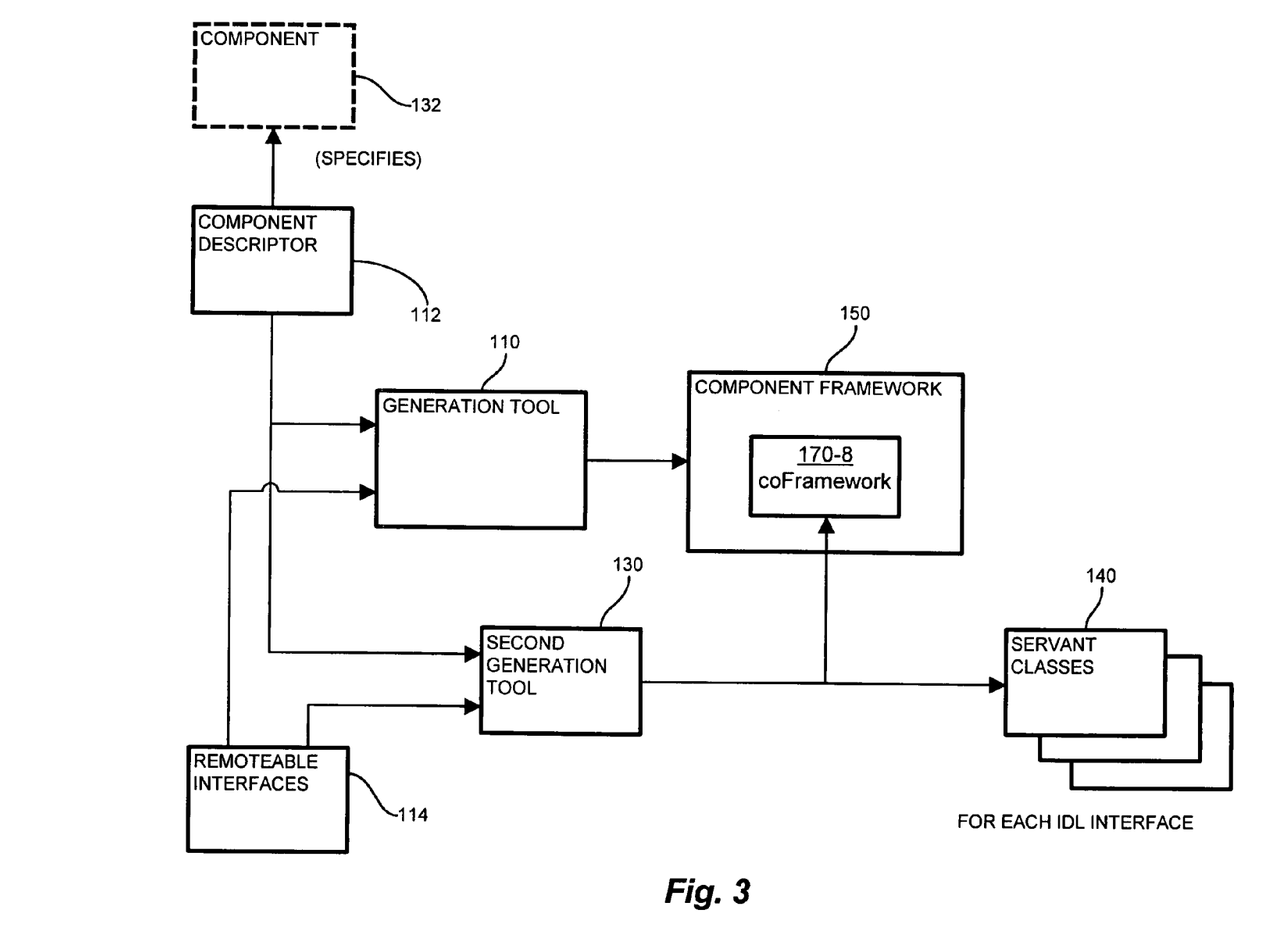
FIG. 3 is a context diagram depicting the component framework as defined herein.

FIG. 3 is a context diagram depicting the component framework 150 as defined herein. Referring to FIG. 3, a component descriptor 112 specifies properties of a component 132, discussed below. The framework 150 also employs remotable interfaces 114 as input to a generation tool 110 for generating the component framework 150, discussed below in FIG. 4. A second generation tool 130 also generates servant classes 140 and the coFramaework 170-8, as discussed below.

Figure 4:
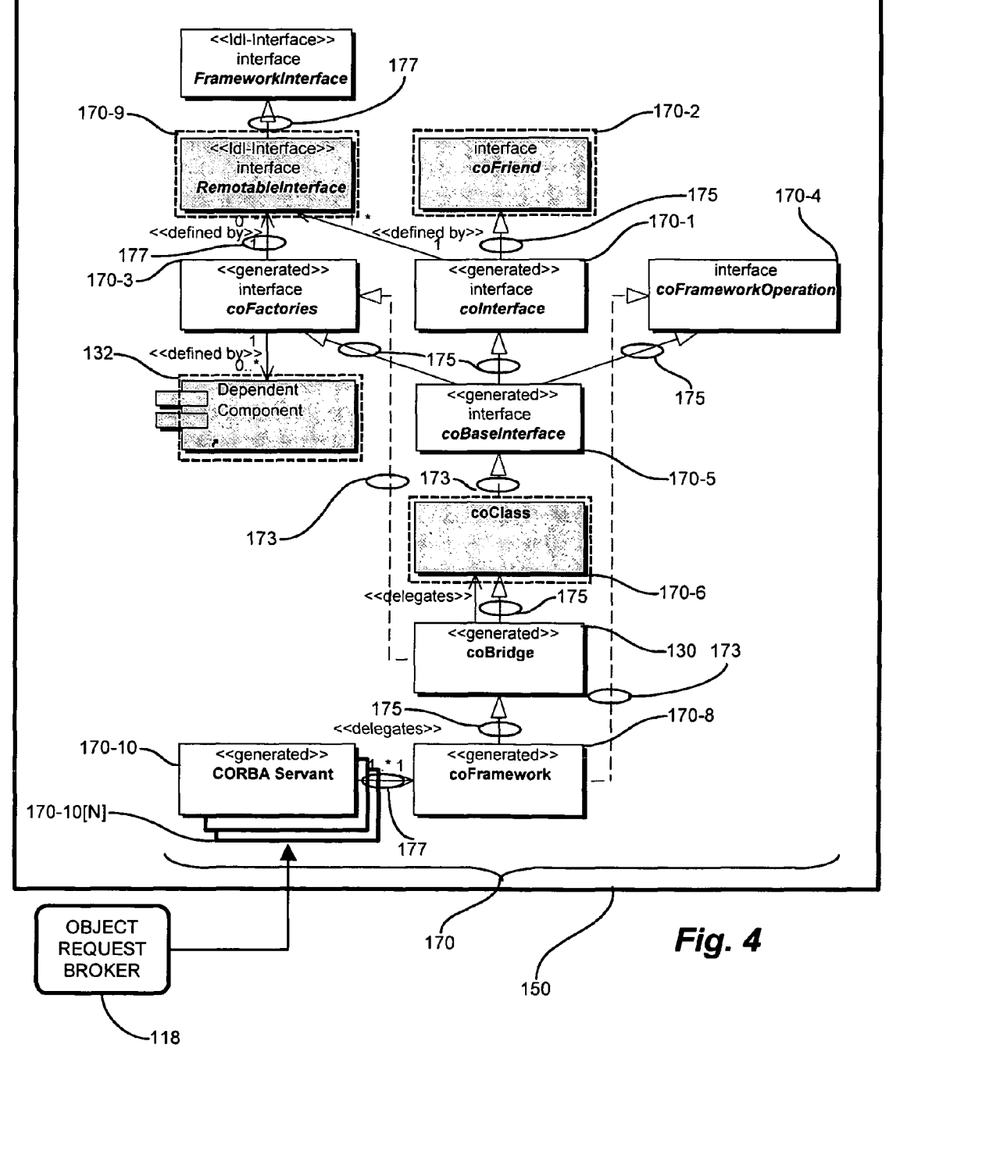
FIG. 4 is a block diagram of the component framework of FIG. 1.
Figure 5:
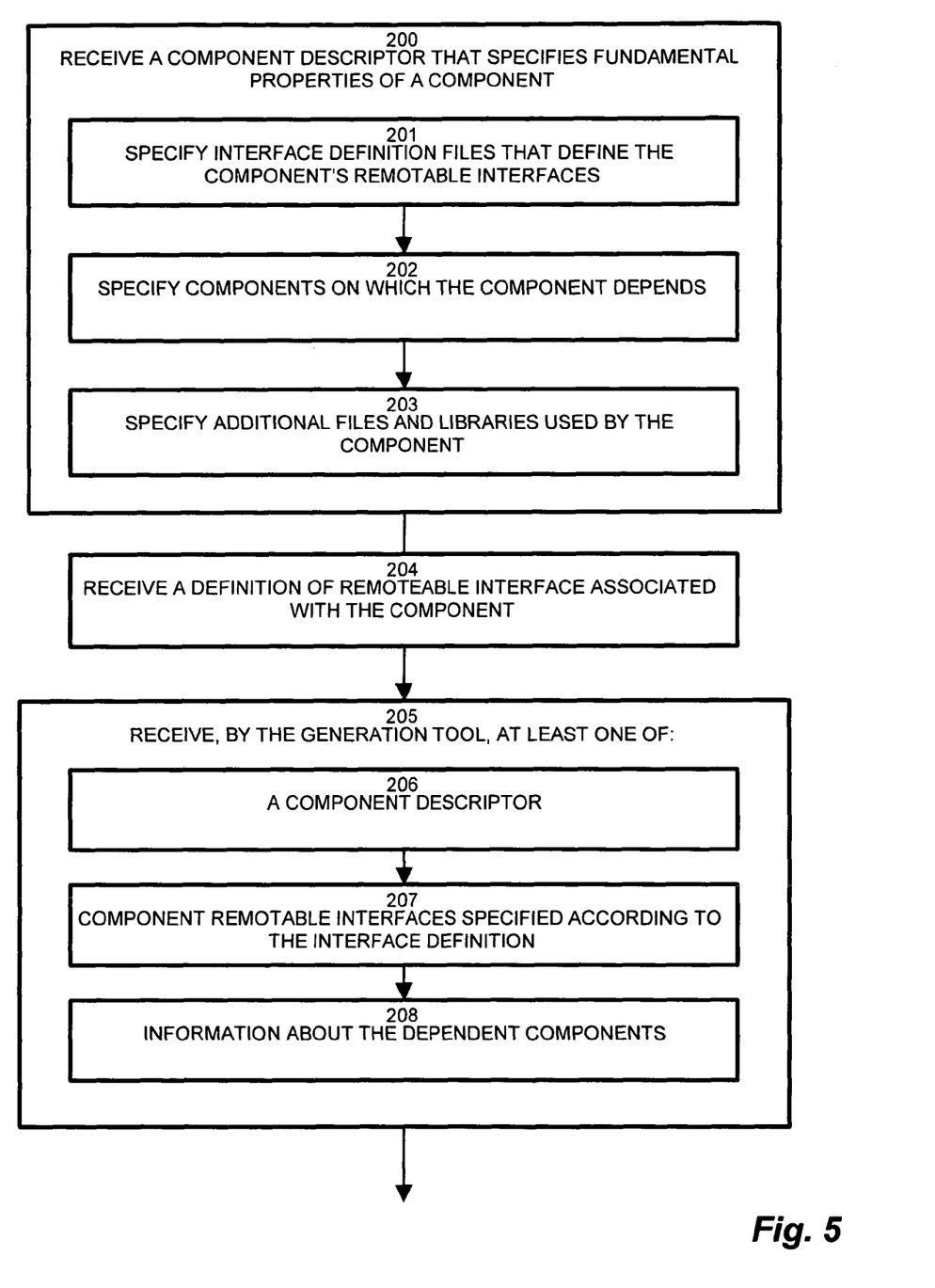
Figure 6:
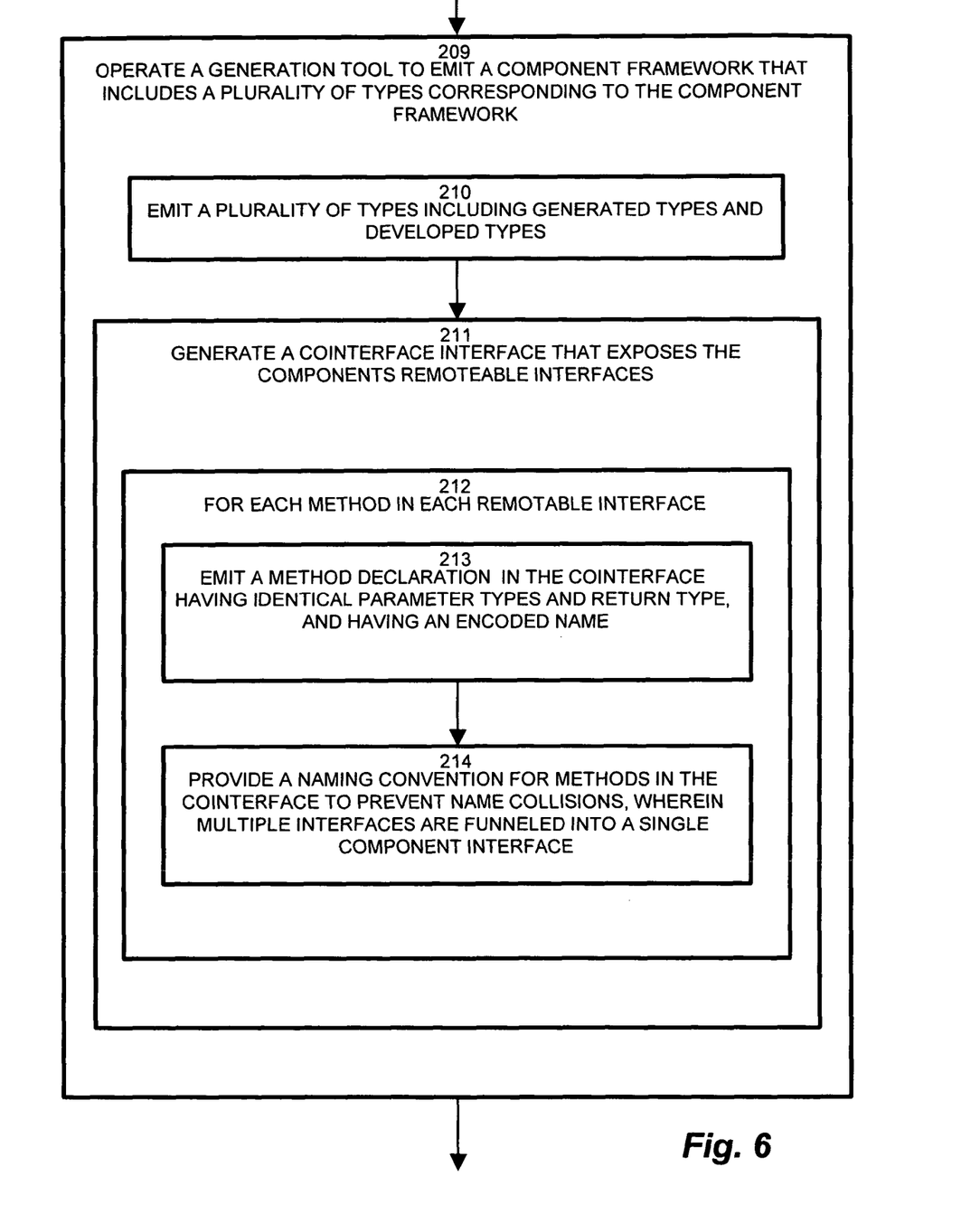
Figure 7:
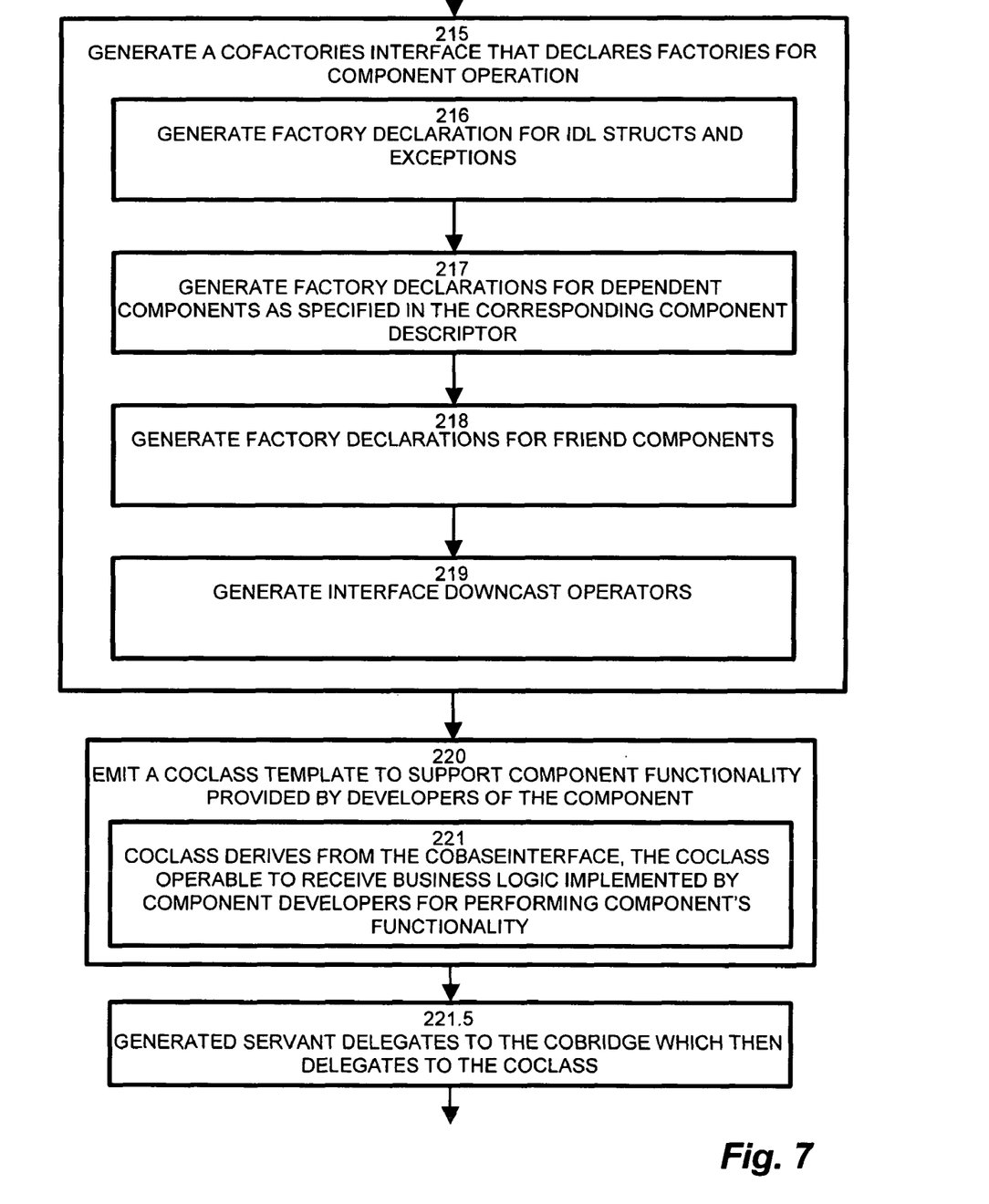
Figure 8:
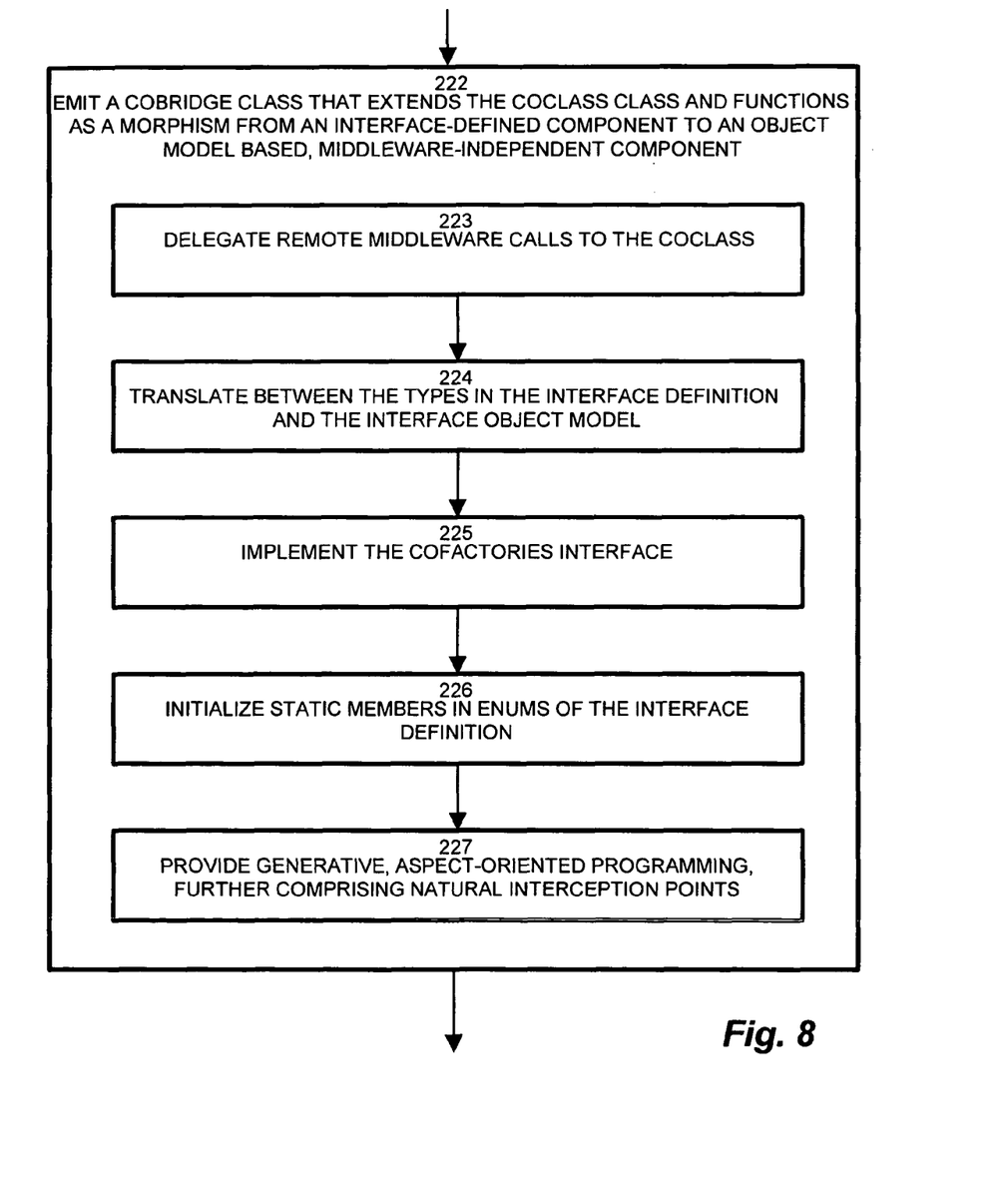
Figure 9:
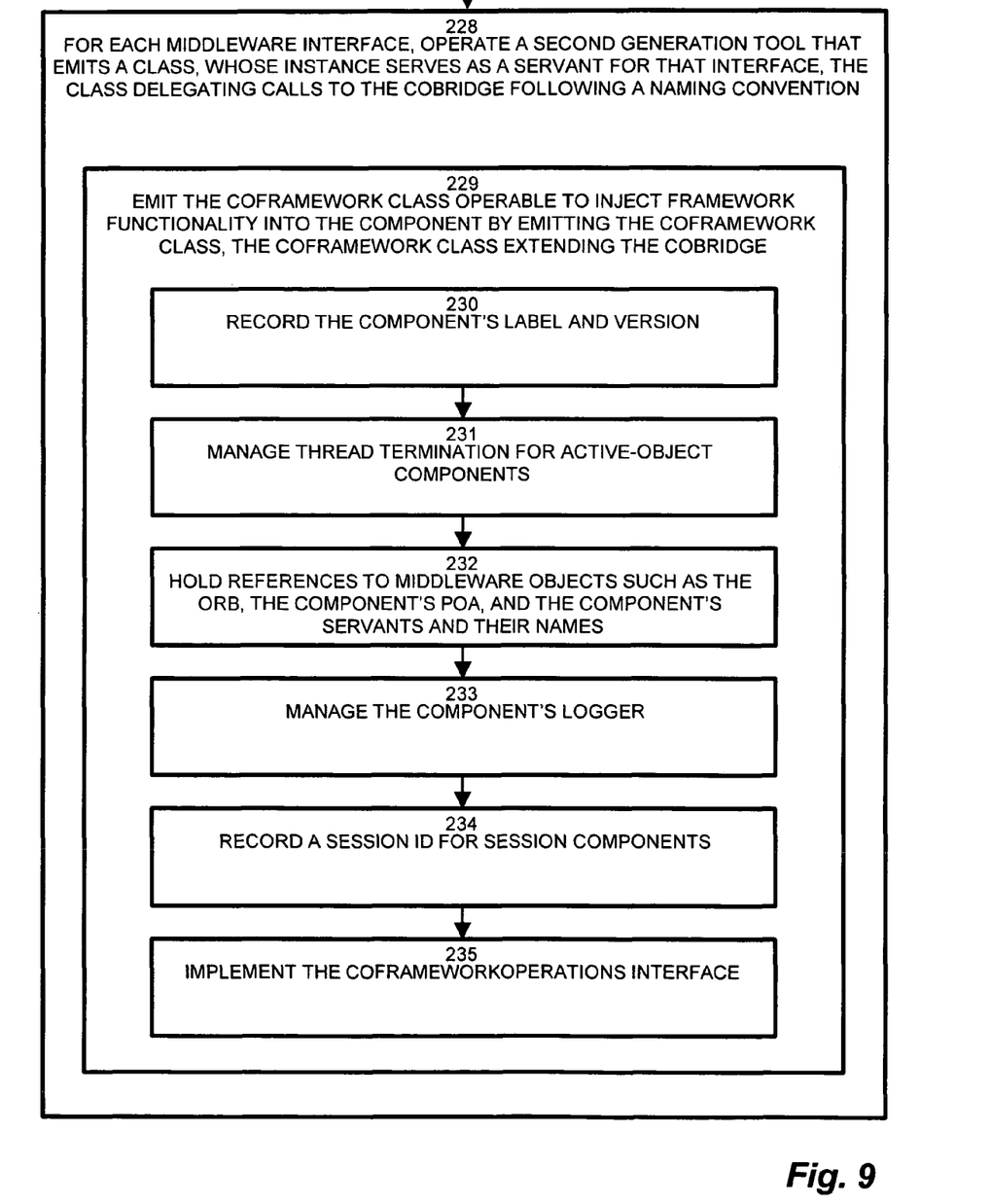

FIG. 4 is a block diagram of the component framework of FIG. 1, discussed in the flowchart in FIGS. 5-9. Referring to FIG. 4, FIG. 4 illustrates the framework as a class diagram of the generated artifacts 170-N (170, generally) in a particular component 132. Note that the term "artifact" is employed herein to refer to the types included in a component 132, and may include, but are not limited to, source code, object code, IDL definitions, .jar files, and other software entities. Each of the artifacts 170 generally represents a type employed within the component. Further, dependent components may also be defined as interfaces and/or classes. The artifacts shown in FIG. 4 may be implemented in C++, Java, or other language conversant with the underlying middleware (i.e. CORBA, in the exemplary configuration). Referring to FIG. 4, solid rectangles represent either framework or generated types, while dotted outline rectangles represent types or components written by component developers, however the build processor may generate templates for such artifacts 170). The artifacts 170 illustrated reside in the components 132. A runtime object request broker 118 such as CORBA, in the exemplary configuration, is operable to instantiate the components 132 on behalf of an application. Further, the broken lines 173 with Δ on top indicate an implementation relation, i.e. A implements B, the outlined solid arrows 175 with Δ on top indicate an extension (i.e. A extends B), and the open arrows 177 indicate a delegation or definition, as indicated.

FIGS. 5-9 are a flowchart of software development using the framework 150 of FIG. 4. Referring to FIGS. 1-9, the first task in component development is writing the component descriptor, which specifies the fundamental properties of the component: label, version, type (service or session), activation modes, synchronization modes, and other properties, as depicted at step 200. The descriptor also specifies all the IDL files that define the component's remotable interfaces, as disclosed at step 201. In addition, the component descriptor specifies all the components on which the component depends (step 202). Finally, the descriptor specifies additional files and libraries used by the component (step 203).

Developing the remotable interfaces in IDL is the next task, as disclosed at step 204. IDL was chosen because it is platform- and language-neutral, not due to its CORBA origins. Consequently, a client developed in C++ could readily talk to the component server, which is now implemented in Java. If necessary, the remotable interfaces could also be written in Java; however, that choice may impair the aforementioned interoperability; a Java-to-IDL compiler may ameliorate the situation.

At step 205, armed with the component's descriptor (step 206), the component's remotable interfaces specified in IDL (step 207), and similar information about the dependent components (step 208), generation tools emit multiple types, depicted at step 209, as illustrated in FIG. 4.

The framework in FIG. 4 can be implemented in both C++ and Java. In this figure, solid rectangles represent either framework or generated types, while dotted outlined rectangles represent types or components written by component developers, as disclosed at step 210.

The generation tool emits the coInterface 170-1 interface, which exposes all the component's remotable interfaces, as depicted at step 211. Specifically, for every method in each remotable interface, as shown at step 212, a method is emitted in the coInterface 170-1 with identical parameter types and return type, but carrying an encoded name, as depicted at step 213, as follows:

<IdlModulesName>_<IdlInterfaceName>_<IdlmethodName>

This naming convention for methods in the coInterface 170-1 prevents name collisions, as multiple interfaces are funneled into a single component interface, as disclosed at step 214.

The coInterface 170-1 extends the coFriend 170-2 interface which is used for close communication among components.

The same generation tool also emits the coFactories 170-3 interface, shown at step 215, containing the following: Factories for IDL structs and exceptions (step 216), Factories for dependent components, specified in the component's descriptor (step 217), Factories for friend components as discussed above (step 218), and Interface downcast operators (step 219).

All components demand basic framework functionality, which is exposed by the coFrameworkOperations 170-4 interface. The same generation tool emits the coBaseInterface 170-5 Java interface, which extends the coInterface 170-1, the coFactories 170-3, and the coFrameworkOperations 170-4. The coBaseInterface 170-5 adds a level of indirection in the inheritance hierarchy, allowing the exposure of future functionality, without perturbing handwritten derived classes.

The same generation tool emits a template for the coClass 170-6 class, as depicted at step 220, which derives from the coBaseInterface 170-5 (step 221), and where the component's functionality is implemented by component developers. Component developers will expend most of their programming effort developing coClasses 170-6. In step 221.5, the generated servant delegates to the coBridge 130, which then delegates to the coClass 170-6 class.

The same generation tool also emits the coBridge 130, as disclosed at step 222, a class which extends the coClass 170-6 and accomplishes the following: Delegates remote CORBA or other middleware calls to the coClass 170-6 (step 223), while translating between the types in the IDL and the interface object models (step 224), Implements the coFactories 170-3 interface (step 225), Initializes all the static members in all the IDL enums (step 226), and allows generative, aspect-oriented programming, as shown at step 227. In particular, it provides natural interception points. In effect, the coBridge 130 functions as a morphism from the IDL-defined component to the component specified in the interface object model. Further details on the use of the morphism among portable middleware interfaces may be found in copending U.S. patent application Ser. No. 11/095,406, filed Mar. 31, 2005, entitled "METHODS AND APPARATUS FOR CREATING MIDDLEWARE INDEPENDENT SOFTWARE," assigned to the assignee of the present invention and incorporated herein by reference.

In particular configurations, the code generator is a categorical-based generation tool, and operating the code generator further includes operating a categorical-based generation tool to emit the component framework. A category is a set of mathematical objects and morphisms, which are functions among those objects. In the exemplary case, the mathematical objects are object models, and the morphisms are mappings among object models that preserve relations among classes in each object model. Morphisms can "forget." In the present configuration, some of the morphisms forget the CORBA middleware. In further detail, a category is defined as follows:

A category C consists of
  a class ob(C) of objects:
  a class hom(C) of morphisms. Each morphism f has a unique source object a and target object b. We write f: a→b, and we say "f is a morphism from a to b". We write hom(a, b) (or homC(a, b)) to denote the hom-class of all morphisms from a to b. (Some authors write Mor(a, b).)
  for every three objects a, b and c, a binary operation hom(a, b)×hom(b, c)→hom(a, c) called composition of morphisms; the composition of f: a→b and g: b→c is written as g o f or gf (Some authors write fg.)

such that the following axioms hold:
(associativity) if f: a→b, g: b→c and h: c→d then h o (g o f)=(h o g) o f, and
(identity) for every object x, there exists a morphism 1x: x→x called the identity morphism for x, such that for every morphism f: a→b, we have 1b o f=f=f o 1a.

From these axioms, one can prove that there is exactly one identity morphism for every object. Some authors use a slight variation of the definition in which each object is identified with the corresponding identity morphism. The morphisms of a category are sometimes called arrows due to the influence of commutative diagrams.

For each CORBA or other middleware interface, a second generation tool emits a Java class, whose single instance serves as a CORBA servant for that interface, as shown at step 228. This Java class can be generated due to its simplicity: it just delegates calls to the coBridge 130 following the naming convention of FIG. 4. This generation tool also injects framework functionality into the component by emitting the coFramework 170-8 class, as depicted at step 229, which extends the coBridge 130 and functions as follows: Records the component's label and version (step 230); Manages thread termination for active-object components (step 231); Holds references to middleware objects such as the ORB, the component's POA, and the component's servants and their names (step 232); Manages the component's logger (step 233); Records the session id for session components (step 234); and Implements the coFrameworkOperations interface (step 235).

Those skilled in the art should readily appreciate that the programs and methods for developing components in a component framework as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for developing components in a component framework has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of producing a component framework that insulates components from an underlying communication infrastructure, the method comprising:
   receiving, at a computer system, a component descriptor that specifies fundamental properties of a component;
   receiving a definition of remotable interfaces associated with the component;
   operating a generation tool to emit a component framework that includes:
   i) a coInterface interface that exposes the components remotable interfaces;
   ii) a coFactories interface that declares factories for component operation;
   iii) a template for a coClass class, the coClass class operable to receive developer programmed functionality; and
   iv) a coBridge class that extends the coClass class and functions as a morphism from an IDL-defined component to an object model based, middleware-independent component;
   wherein generating the coInterface interface, via at least one processor, further comprises:
   for each method in each remotable interface:
   emit a method in the coInterface having similar parameter types and return type;
   having an encoded name; and
   providing a naming convention for methods in the coInterface to prevent name collisions, wherein multiple interfaces are funneled into a single component interface;
   wherein operating a generation tool to emit a component framework includes:
   emitting the component framework upon processing, by the computer system, of (i) the component descriptor and (ii) the definition of remotable interfaces associated with the component.

2. The method of claim 1 wherein receiving the component descriptor further comprises:
   specifying interface definition files that define the component's remotable interfaces;
   specifying components on which the component depends; and
   specifying additional files and libraries used by the component.

3. The method of claim 1 wherein operating the generation tool further comprises emitting a plurality of types corresponding to the component framework, further including:
   receiving, by the generation tool, at least one of:
   a component descriptor;
   component remotable interfaces specified according to the interface definition; and
   information about the dependent components; and
   emitting a plurality of types of the component framework, the types further including generated types emitted by the generation tool, and developed types represent types or components written by component developers.

4. The method of claim 1 wherein generating the coFactories interface further comprises generating factories for IDL structs and exceptions.

5. The method of claim 4 wherein generating the coFactories interface further comprises generating factories for dependent components as specified in the corresponding component descriptor.

6. The method of claim 5 wherein generating the coFactories interface further comprises generating factories for friend components.

7. The method of claim 6 wherein generating the coFactories interface further comprises generating interface downcast operators.

8. The method of claim 1 further comprising generating:
   a coFrameworkOperations interface, the coFrameworkOperations interface operable to expose basic framework functionality; and
   a coBaseInterface interface, which extends the coInterface, the coFactories, and the coFrameworkOperations interface, the coBaseInterface for providing a level of indirection in the inheritance hierarchy for allowing the exposure of future functionality, and for avoiding perturbing handwritten derived classes.

9. The method of claim 1 wherein the coClass template derives from the coBaseInterface, the coClass template operable to receive business logic implemented by component developers for performing component's functionality.

10. The method of claim 9 wherein the coBridge is further operable to:
    delegate remote middleware calls to the coClass; and
    translate between the types in the interface definition and the interface object model.

11. The method of claim 10 wherein the coBridge is further operable to implement the coFactories interface.

12. The method of claim 11 wherein the coBridge is further operable to initialize static members in enums of the interface definition.

13. The method of claim 12 wherein the coBridge is operable to provide generative, aspect-oriented programming, further comprising natural interception points.

14. The method of claim 1 further comprising, for each middleware interface, operating a second generation tool that emits a class, whose instance serves as a servant for that interface, the class delegating calls to the coBridge following a naming convention.

15. The method of claim 14 further comprising injecting framework functionality into the component by emitting the co Framework class, the coFramework class extending the coBridge and further operable for:
    recording the component's label and version;
    managing thread termination for active-object components; and
    holding references to middleware objects such as the ORB, the component's POA, and the component's servants and their names.

16. The method of claim 14 wherein the second generation tool is further operable to emit the coFramework class operable to:
    manage the component's logger;
    record a session id for session components; and
    implement the coFrameworkOperations interface.

17. The method of claim 1 wherein operating the code generator further comprises operating a categorical-based generation tool to emit the component framework.

18. The method of claim 1 operating a generation tool to emit a component framework comprises applying category theory to generate code.

19. A computer readable storage medium encoded with processing logic that, when executed on a processor in a computer system provides a generator that causes the computer system to perform the operations of:
    receiving a component descriptor that specifies fundamental properties of a component;
    receiving a definition of remotable interface associated with the component;
    operating a generation tool to emit a component framework that includes:
        i) a coInterface interface that exposes the components remotable interfaces;
        ii) a coFactories interface that declares factories for component operation;
        iii) a template for a coClass class, the coClass class operable to receive developer programmed functionality; and
        iv) a coBridge class that extends the coClass class and functions as a morphism from an IDL-defined component to an object model based, middleware-independent component;
    wherein generating the coInterface interface, via at least one processor, further comprises:
        for each method in each remotable interface:
            emit a method in the coInterface having similar parameter types and return type;
            having an encoded name; and
        providing a naming convention for methods in the coInterface to prevent name collisions, wherein multiple interfaces are funneled into a single component interface, wherein operating a generation tool to emit a component framework includes:
            emitting the component framework upon processing, by the computer system, of (i) the component descriptor and (ii) the definition of remotable interfaces associated with the component.

20. A computer system comprising:
    a memory;
    a processor,
    an interconnection mechanism coupling the memory and the processor;
    wherein the memory is encoded with a generator that when executed on the processor provides a means to generate a component framework, said means including:
    means for receiving a component descriptor that specifies fundamental properties of a component;
    means for receiving a definition of remotable interface associated with the component;
    means for operating a generation tool to emit a component framework that includes:
        i) a coInterface interface that exposes the components remotable interfaces;
        ii) a coFactories interface that declares factories for component operation;
        iii) a template for a coClass class, the coClass class operable to receive developer programmed functionality; and
        iv) a coBridge class that extends the coClass class and functions as a morphism from an IDL-defined component to an object model based, middleware-independent component;
    wherein generating the coInterface interface further comprises:
        for each method in each remotable interface:
            emit a method in the coInterface having similar parameter types and return type;
            having an encoded name; and
        providing a naming convention for methods in the coInterface to prevent name collisions, wherein multiple interfaces are funneled into a single component interface.

21. The method as in claim 1, wherein having an encoded name includes:
    having a unique encoded name, the unique encoded name different than an encoded name of any other method emitted from a respective remotable interface.

* * * * *